US012372831B2

(12) United States Patent
Lincheneau et al.

(10) Patent No.: US 12,372,831 B2
(45) Date of Patent: Jul. 29, 2025

(54) OPTOELECTRONIC DEVICE COMPRISING A POLARISER AND AT LEAST ONE RADIATION EMITTER

(71) Applicant: ALEDIA, Echirolles (FR)

(72) Inventors: Christophe Lincheneau, Moirans (FR); Ivan-Christophe Robin, Grenoble (FR)

(73) Assignee: ALEDIA, Echirolles (FR)

( * ) Notice: Subject to any disclaimer, the term of this patent is extended or adjusted under 35 U.S.C. 154(b) by 214 days.

(21) Appl. No.: 17/919,086

(22) PCT Filed: Apr. 16, 2021

(86) PCT No.: PCT/EP2021/059851
§ 371 (c)(1),
(2) Date: Oct. 14, 2022

(87) PCT Pub. No.: WO2021/209580
PCT Pub. Date: Oct. 21, 2021

(65) Prior Publication Data
US 2023/0185132 A1   Jun. 15, 2023

(30) Foreign Application Priority Data
Apr. 17, 2020   (FR) .................................. 2003885

(51) Int. Cl.
*G02F 1/13357*   (2006.01)
*G02F 1/1335*    (2006.01)
(52) U.S. Cl.
CPC .... *G02F 1/13362* (2013.01); *G02F 1/133603* (2013.01); *G02F 1/133614* (2021.01); *G02F 1/133621* (2013.01)

(58) Field of Classification Search
CPC ................................................... G02F 1/13362
See application file for complete search history.

(56) References Cited

U.S. PATENT DOCUMENTS

| 2008/0116468 | A1  | 5/2008  | Radkov et al. |
| 2017/0123267 | A1* | 5/2017  | Yanai ................... G02B 5/3025 |
| 2017/0307936 | A1* | 10/2017 | Tseng ................ G02F 1/133617 |

(Continued)

OTHER PUBLICATIONS

International Search Report for PCT/EP2021/059851, mailed Apr. 30, 2021, 6 pages.

(Continued)

*Primary Examiner* — Edmond C Lau
(74) *Attorney, Agent, or Firm* — NIXON & VANDERHYE

(57) ABSTRACT

Disclosed is a device including at least one emitting element and a polariser, each emitting element being configured to emit a first radiation having a first range of wavelengths, the polariser being configured to be traversed at least partially by the first radiation, each emitting element including an emitter and a converter the emitter being configured to emit a second radiation having a second range of wavelengths, the second range being distinct from the range, the converter being configured to at least partially absorb the second radiation and to emit the radiation in response, each converter being interposed between the corresponding radiation emitter and the polariser. Each converter is configured so that the first radiation is rectilinearly polarised along a polarisation direction.

22 Claims, 3 Drawing Sheets

(56) References Cited

U.S. PATENT DOCUMENTS

2017/0365749 A1    12/2017  Mönch et al.
2018/0095327 A1*   4/2018   Lee .................. G02F 1/133617
2019/0018287 A1    1/2019   Lüchinger et al.

OTHER PUBLICATIONS

Written Opinion of the ISA for PCT/EP2021/059851, mailed Apr. 30, 2021, 6 pages.
Search Report for FR2003885, dated Oct. 28, 2020, 2 pages.

* cited by examiner

OPTOELECTRONIC DEVICE COMPRISING A POLARISER AND AT LEAST ONE RADIATION EMITTER

CROSS-REFERENCE TO RELATED APPLICATIONS

This application is the U.S. national phase of International Application No. PCT/EP2021/059851 filed Apr. 16, 2021, which designated the U.S. and claims priority to FR Patent Application No. 2003885 filed Apr. 17, 2020, the entire contents of each of which are hereby incorporated by reference.

FIELD OF THE INVENTION

The present invention relates to an optoelectronic device comprising a polariser and at least a first emitting element configured to emit a first radiation.

CONTEXT OF THE INVENTION

Many types of optoelectronic devices include radiation-emitting elements and polarisers. The emitting elements are intended to emit radiation which will be used, for example, to form part of an image. This electronic device is, for example, a display screen, a light projector, or a pair of goggles used for virtual reality immersion.

The emitting elements are, in particular, light-emitting diode assemblies, or liquid crystal assemblies allowing the passage of light emitted by a light source to be locally blocked or authorised.

The polariser can perform many roles, such as in conjunction with a quarter-waveplate to limit the reflection of external radiation onto the optoelectronic device, or to control the emission of light depending on the orientation of a liquid crystal through which the emitted light passes.

However, the passage of the radiation emitted by the different emitting elements through the polariser results in a loss of intensity of this radiation, which depends on the polarisation of the emitted radiation and the spatial orientation of the polariser. In particular, if the emitting elements emit light with an elliptical polarisation, 50 percent (%) of the emitted radiation is blocked by the polariser. Light sources such as light-emitting diodes used in the prior art naturally emit radiation with such polarisation. This results in a significant loss of performance of the optoelectronic device.

SUMMARY OF THE INVENTION

There is therefore a need for an optoelectronic device with a polariser and an emitter that is more efficient than prior art optoelectronic devices.

For this purpose, an optoelectronic device is proposed comprising at least a first emitting element and a polariser, each first emitting element being configured to emit a first radiation having a first range of wavelengths, the polariser being configured to be traversed at least partially by the first radiation, each first emitting element comprising an emitter and a converter, the emitter being configured to emit a second radiation having a second range of wavelengths, the second range being distinct from the first range, the converter being configured to at least partially absorb the second radiation and to emit in response the first radiation, the polariser having an axis, each converter being interposed between the corresponding radiation emitter and the polariser, each converter being configured so that the first radiation is rectilinearly polarised along a polarisation direction.

According to particular embodiments, the optoelectronic device comprises one or more of the following features taken in isolation or in any combination that is technically possible:

- each first emitting element comprises a quarter-waveplate interposed between the emitter and the converter, the quarter-waveplate having a slow axis forming an angle of 45 degrees with the polariser axis.
- the polarisation direction is parallel to the polariser axis.
- each first emitting element comprises a quarter-waveplate interposed between the converter and the polariser, the quarter-waveplate having a slow axis forming an angle of 45 degrees with the polariser axis.
- the polarisation direction is perpendicular to the polariser axis.
- the polariser is configured to be traversed by each first radiation in a normal direction perpendicular to the axis of the polariser, each converter comprising a set of particles having a first dimension in a first direction parallel to the polarisation direction and a second dimension in a second direction perpendicular to the polarisation direction and to the normal direction, a ratio between, in the numerator, the first dimension and, in the denominator, the second dimension, being greater than or equal to two.
- each first or second dimension is between 1 nanometres and 1,000 nanometres.
- each transmitter has a light-emitting diode.
- each transmitter has a liquid crystal.
- the second radiation is blue light.
- the optoelectronic device further comprises at least one second emitting element, each second emitting element being configured to emit a third radiation having a third wavelength range different from the first range, the polariser being configured to be traversed at least partially by the third radiation.
- the third radiation is identical to the second radiation, each second emitting element comprising a radiation emitter, the second emitting element being without a converter.
- the optoelectronic device comprises a plurality of emitting elements, the optoelectronic device further comprising at least one barrier interposed between each emitting element and each other emitting element, the barrier being configured to prevent each radiation from passing through the barrier.
- each first radiation is selected from the group consisting of: red light and green light.
- the optoelectronic device comprises a plurality of polarisers, each polariser being associated with a corresponding emitting element, the polariser being configured to be traversed at least partially by the first radiation emitted by the corresponding emitting element, the polarisation direction of at least one emitting element being different from the polarisation direction of at least one other emitting element, the polarisation direction of each emitting element associated with a polariser being parallel to the axis of the corresponding polariser.
- the optoelectronic device comprises a plurality of emitting elements, in which the polarisation direction of at least one emitting element is different from the polarisation direction of at least one other emitting element, the electronic device comprising a polariser configured to be traversed at least partially by the first radiation emitted by each of the two emitting elements in question.

an angular difference between the polarisation directions of at least two emitting elements is between 85 degrees and 95 degrees.

BRIEF DESCRIPTION OF THE DRAWINGS

Characteristics and advantages of the invention will become apparent upon reading the following description, given only as a nonlimiting example, referring to the attached drawings, in which.

DETAILED DESCRIPTION OF PREFERRED EMBODIMENTS

Figure 1:
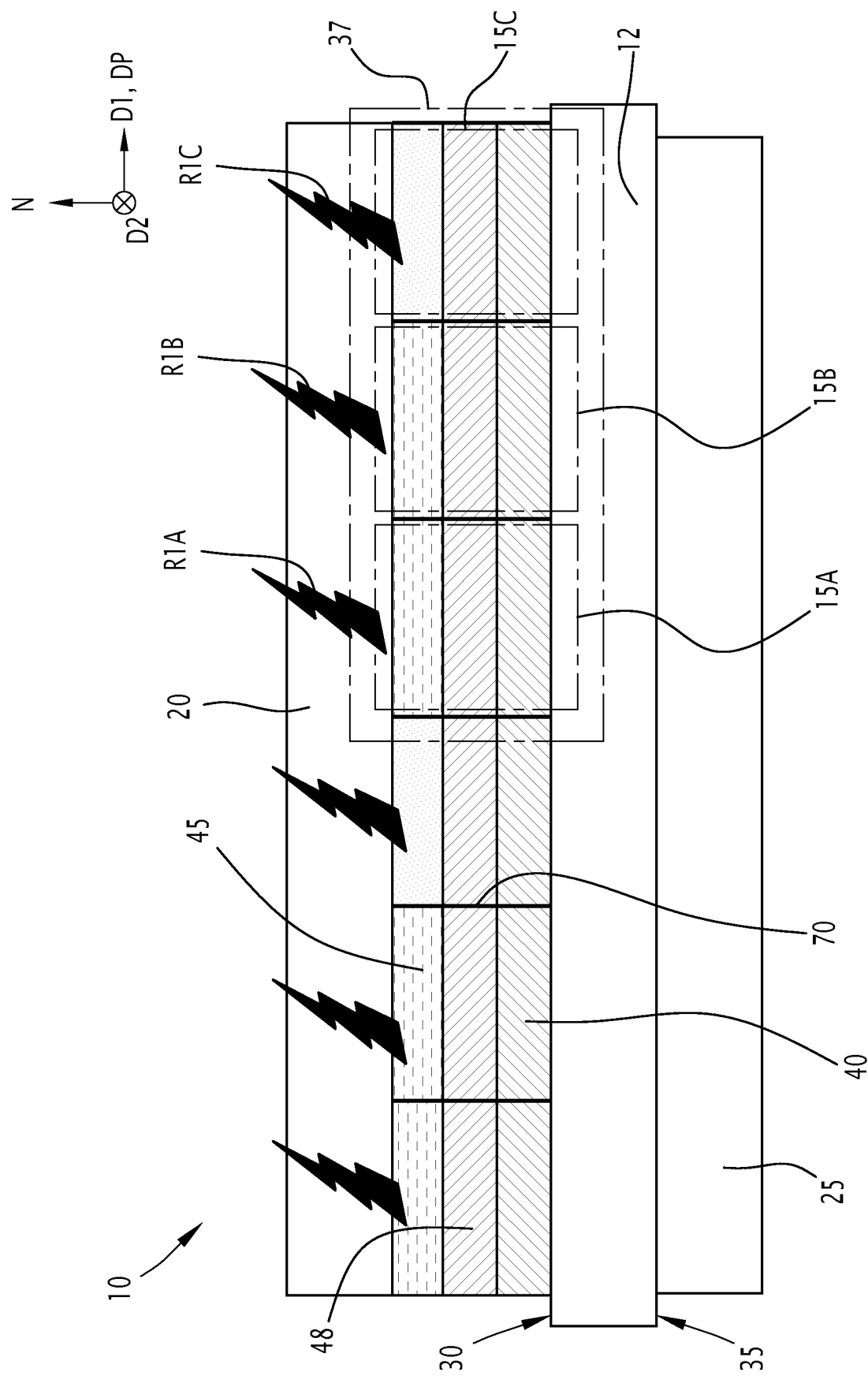
FIG. 1 is a partial schematic cross-sectional representation of an example optoelectronic device according to the invention, comprising a set of emitting elements.

A first example optoelectronic device 10 is depicted in FIG. 1.

The optoelectronic device 10 is, for example, a display screen suitable for displaying images. Alternatively, the optoelectronic device 10 is a lamp, a projector, or a pair of virtual reality or augmented reality goggles.

The optoelectronic device 10 comprises a substrate 12, a set of emitting elements 15A, 15B, 15C, a polariser 20 and a control circuit 25. Optionally, the optoelectronic device 10 further comprises a wall assembly 70.

The substrate 12 is configured to carry each emitting element 15A, 15B, 15C.

The substrate 12 is, for example, flat. In particular, the substrate 12 extends in a plane perpendicular to a normal direction X.

In addition, two directions D1 and D2 are defined, perpendicular to each other and to the normal direction N.

The substrate 12 is bounded in the normal direction N by a first face 30 and by a second face 35 of the substrate 12.

Each of the first face 30 and the second face 35 is, for example, flat.

The substrate 12 is, for example, made at least partially of a first semiconductor material such as silicon, or insulating material such as glass or sapphire.

The set of emitting elements 15A, 15B, 15C comprises at least one set of first emitting elements 15A. As an optional addition, the set of emitting elements further comprises a set of second emitting elements 15B and/or a set of third emitting elements 15C.

Each emitting element 15A, 15B, 15C is configured to emit a first radiation R1A, R1B, R1C.

Each first radiation comprises a first set of electromagnetic waves R1A, R1B, R1C.

A wavelength is defined for each electromagnetic wave. Each first set corresponds to a first wavelength range. The first wavelength ranges is the group formed by all wavelengths of the first set of electromagnetic waves.

A first average wavelength is defined for each first wavelength range.

Every first radiation R1A, R1B, R1C is, in particular, visible radiation. An example of visible light is first radiation R1A, R1B, R1C with a first average wavelength between 430 nanometres (nm) and 750 nm.

Each first emitting element 15A is, for example, configured to emit a first red radiation R1A.

Each second emitting element 15B is, for example, configured to emit a first green radiation R1B.

Each third emitting element 15C is, for example, configured to emit a first blue radiation R1C.

A first blue radiation R1C has, for example, an average wavelength between 430 nm and 470 nm.

A first green radiation R1B has, for example, an average wavelength between 520 nm and 560 nm.

A first red radiation R1A has, for example, an average wavelength between 580 nm and 700 nm.

Each emitting element 15A, 15B, 15C is, for example, intended to form part of a picture element 37, also called a "pixel".

Each pixel 37 contains one or more neighbouring emitting elements 15A, 15B, 15C. For example, when the display is a monochrome display, each pixel 37 has a single emitting element 15A, 15B, 15C.

When the display is a multicolour display, each pixel 37 comprises a plurality of emitting elements 15A, 15B, 15C, at least one of the emitting elements 15A, 15B, 15C being configured to emit a first radiation R1A, R1B, R1C having an average wavelength different from the average wavelengths of the other emitting elements 10 of the same pixel 37.

In particular, each pixel 37 comprises at least one first emitting element 15A, at least one second emitting element 15B and at least one third emitting element 15C.

In the example shown in FIG. 1, each pixel 37 has three emitting elements 15A, 15B, 15C aligned successively along the direction D1, however the spatial distribution of the emitting elements 15A, 15B, 15C of the same pixel 37 may vary.

It should be noted that the number of emitting elements 15A, 15B, 15C of each pixel 37 may vary, as may their colours.

Alternatively, each first radiation R1A, R1B, R1C is identical to the other first radiations R1A, R1B, R1C. For example, every first radiation R1A, R1B, R1C is blue radiation, or ultraviolet radiation.

Each emitting element 15A, 15B, 15C has an emitter 40. In addition, each first or second emitting element 15A, 15B further comprises a converter 45.

It should be noted that in the first example optoelectronic device 10, each third emitting element 15C is devoid of a converter 45. However, embodiments in which at least a third emitting element 15C comprises a radiation converter are also conceivable.

In addition, each emitting element 15A, 15B, 15C comprises a quarter-waveplate 48.

Figure 2:
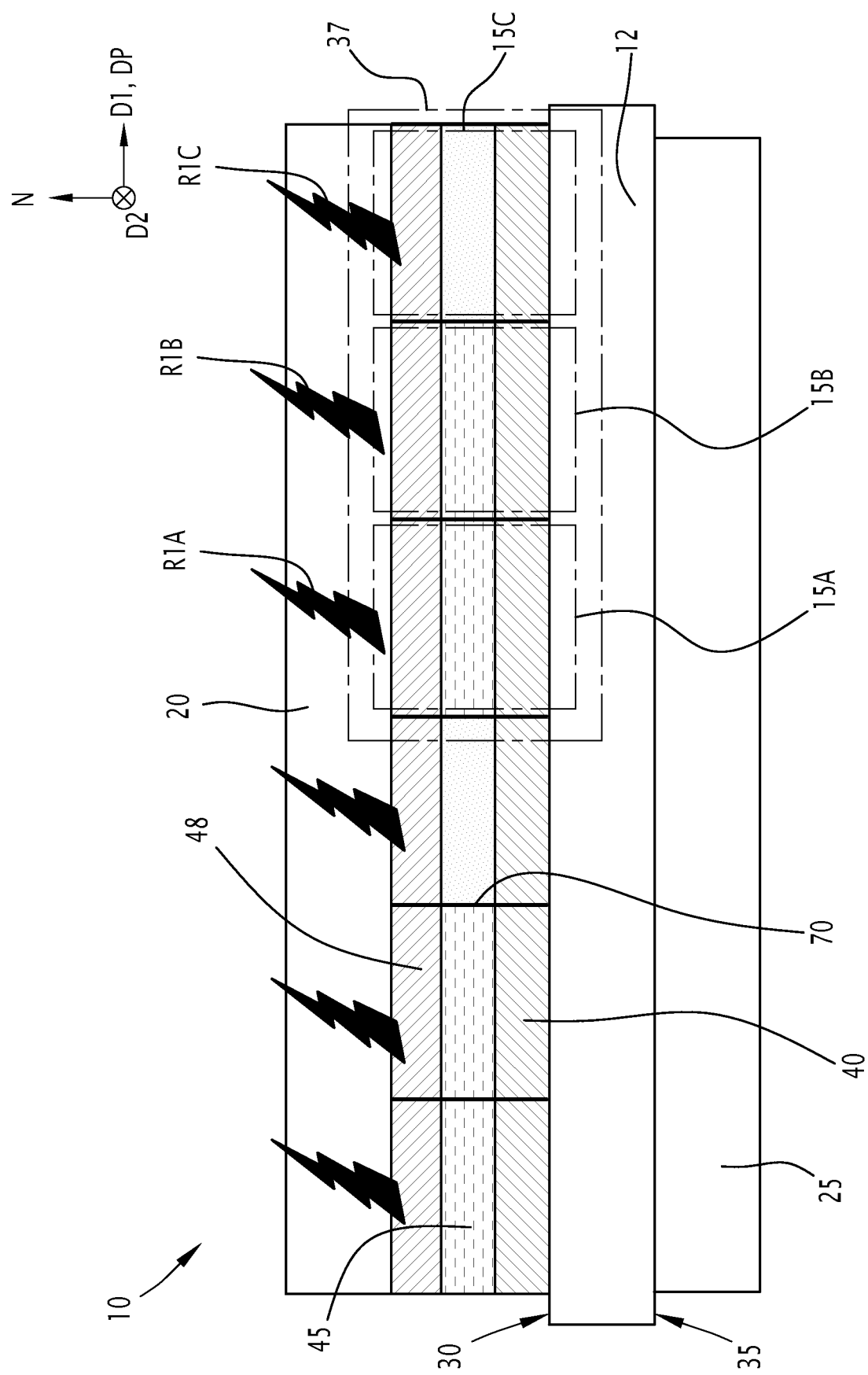
FIG. 2 is a partial schematic cross-sectional representation of another example optoelectronic device according to the invention, comprising a set of emitting elements.

The quarter-waveplate 48 is, for example, interposed between the emitter 40 and the corresponding converter 45 as shown in FIG. 1. Alternatively, as shown in FIG. 2, the converter 45 is interposed between the emitter 40 and the quarter-waveplate 48.

Each emitter 40 is borne by the first face 30. For example, each emitter 40 extends from the first face 30 in the normal direction N.

The emitters 40 of the individual emitting elements 10 form, for example, a two-dimensional grating in a plane perpendicular to the normal direction N, for example a square-mesh grating. Alternatively, the mesh is hexagonal, triangular or rectangular.

Each emitter 40 is, for example, a semiconductor structure 47. The term "semiconductor structure" means any structure consisting at least partially of a semiconductor material.

An example of a semiconductor structure is a stack of semiconductor layers stacked along the normal direction D. Such a structure is often referred to as a "two-dimensional structure".

Other examples of semi-conductor structures are a three-dimensional semiconductor structure or a set of three-dimensional semi-conductor structures.

A lateral dimension is defined for each emitter 40. The lateral dimension is the maximum dimension of a contour surrounding the emitter 40 in a plane perpendicular to the normal direction N, while not surrounding any part of another emitter 40.

The lateral dimension is less than or equal to 1 millimetre (mm), in particular less than or equal to 20 µm. For example, the lateral dimension is less than or equal to 10 µm. In one embodiment, the lateral dimension is less than or equal to 5 µm.

It should be noted that the lateral dimension may vary.

Each emitter 40 is configured to emit a second radiation R2. For example, each emitting structure is an LED structure.

In particular, each emitter 40 is configured to emit the second radiation R2 when the emitter 40 is passed through by an electric current, as will be explained in more detail below.

The second radiation R2 has a second wavelength range. The second range is separate from the first range. In particular, the second range has a second average wavelength, the second average wavelength being different from the first average wavelength. In particular, the second average wavelength is strictly less than the first average wavelength.

The second radiation R2 is, for example, blue light. In particular, the second radiation R2 is identical to the first radiation R1C of each third emitting element 15C, when these third emitting elements 15C are devoid of converters 45.

Alternatively, the second radiation R2 is ultraviolet radiation, i.e. radiation with a second average wavelength between 200 nm and 405 nm.

Each second radiation R2 is, for example, radiation with elliptical polarisation.

Figure 3:
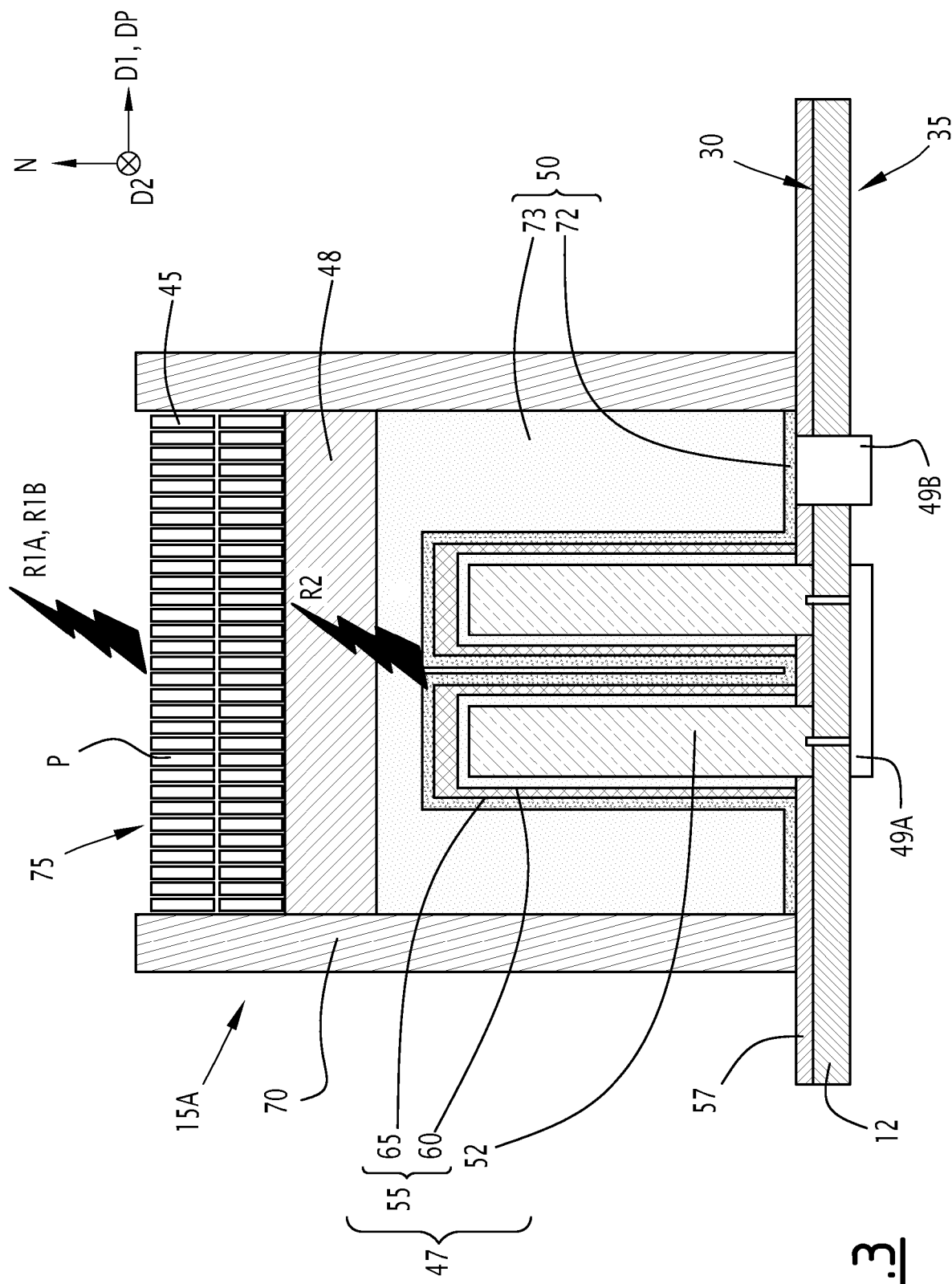
FIG. 3 is a partial schematic cross-sectional representation of an example emitting element of FIG. 1.

An example emitting element 15A, 15B, 15C comprising an emitter 40 is shown in FIG. 3.

The emitter 40 comprises, for example, one or a set of semiconductor structure(s) 47 at least one first contact 49A, at least one second contact 49B and a block 50.

Each semiconductor structure 47 is, for example, an LED structure.

Each semiconductor structure 47 is, for example, a three-dimensional structure. It should be noted that in some possible variants, the semiconductor structure 47 is a two-dimensional structure.

According to the example shown in FIG. 3, the emitting element 15A, 15B, 15C comprises a plurality of three-dimensional semiconductor structures 47, these emitting structures 47 being in particular identical to each other. Two semiconductor structures 47 are shown in FIG. 3, although this number may vary.

Each semiconductor structure 47 extends from the first face 35 along the normal direction N.

Each semiconductor structure 47 is configured to emit all or some of the second radiation R2 when the semiconductor structure 47 is passed through by an electric current.

The semiconductor structure 47 is, for example, a microwire.

The semiconductor structure 47 comprises a core 52 and a cover layer 55.

The core 52 acts as either an n-doped layer or a p-doped layer. The core 52 is made of a semiconductor material called "core semiconductor material" in the following.

For example, the core semiconductor material is n-doped.

The core semiconductor material is, for example, GaN.

The core 52 is configured to support the cover layer 55.

The core 52 extends from the first face 35 along the normal direction N. In particular, the core 52 is electrically connected to the substrate 12.

The core 52 extends, for example, through an electrically insulating layer 57 covering part of the first face 35.

The core 52 is, for example, a cylinder.

A cylindrical surface is a surface consisting of all points on all lines that are parallel to a line and pass through a fixed plane curve in a plane that is not parallel to the line. A solid bounded by a cylindrical surface and two parallel planes is called a "cylinder". When a cylinder is said to extend in a given direction, that direction is parallel to the line.

A cylinder has a uniform cross-section along the direction in which the cylinder extends.

The cross-section of the core 52 is polygonal. For example, the cross-section is hexagonal.

However, other shapes can be considered for the cross-section.

It should be noted that the shape of the core 52 may vary, for example if the semiconductor structure 47 is not a microwire.

A diameter is defined for core 52. The diameter is, in the case of a cylindrical core 52, the maximum distance between two points on the core 52 that are diametrically opposed in a plane perpendicular to the normal direction N.

When the core 52 has a hexagonal cross-section, the core diameter is measured between two opposite corners of the hexagon.

The diameter of the core 52 is between 10 nm and 5 µm.

A length measured along the normal direction N is defined for the core 52. The length is between 10 nm and 100 µm.

The core 52 has a top face and a side face.

The top face delimits the core 52 along the normal direction N. For example, the top face is perpendicular to the normal direction N.

The side face surrounds the core 52 in a plane perpendicular to the normal direction N.

The side face extends between the top face and the substrate 12. When the core 52 has a polygonal cross-section, the side face has a set of flat facets.

The cover layer 55 at least partially covers the core 52. For example, the cover layer 55 at least partially covers the top face of the core 52. In particular, the cover layer 55 completely covers the top face.

In the example shown in FIG. 3, the cover layer 55 at least partially covers the top face and at least partially the side face.

As can be seen in FIG. 3, the cover layer 55 completely surrounds the core 52 in a plane perpendicular to the normal direction N. In other words, the cover layer 55 forms a shell around the core 52.

The cover layer 55 includes at least an emitting layer 60 and a doped layer 65.

Each emitting layer 60 is configured to emit the second radiation R2 when the electrical current passes through the semiconductor structure 47.

Each emitting layer 60 is interposed between the core 52 and the doped layer 65.

Each emitting layer 60 is made of a semi-conductor material.

For example, the cover layer 55 includes a stack of emitting layers 60 interposed between the core 52 and the doped layer 65.

Each emitting layer 60 is, for example, a quantum well. In particular, the thickness of each emitting layer 60 is, at any point of the emitting layer 60, between 1 nm and 200 nm.

When several superimposed emitting layers 60 are present, these emitting layers are, in particular, separated from each other by semi-conducting barrier layers, each barrier layer having a bandgap value strictly greater than the bandgap value of the emitting layers between which the barrier layer is interposed.

The thickness of each emitting layer 60 is measured, at any point on the emitting layer 60, along a direction perpendicular to the surface of the core 52 at the point on the surface of the core 52 closest to the point on the emitting layer 60.

For example, the thickness of each emitting layer 60 at a point on the emitting layer 60 that is aligned with a point on the core 52 along the normal direction N is measured along the normal direction N. The thickness of each emitting layer 60 at a point on the emitting layer 60 that is aligned in a plane perpendicular to the normal direction with a point on the core 52 is measured along a direction perpendicular to the nearest facet of the core 52.

Each emitting layer 60 is, for example, made of InGaN.

The doped layer 65 at least partially covers the emitting layer(s) 60.

Each doped layer 65 is made of a semi-conductor material.

The doped layer 65 acts as an n-doped layer or a p-doped layer of the LED structure.

The type of doping (n or p) in the doped layer 65 is opposite to the type of doping (p or n) in the core 52. For example, the doped layer 65 is p-doped.

The doped layer 65 is, for example, made of GaN.

The first and second contacts 49A, 49B are electrically connected to the control circuitry 25 and are configured to allow the control circuitry 25 to generate an electrical current through each semiconductor structure 47 by imposing an electrical potential difference between each first contact 49A and each second contact 49B. In particular, the contacts 49A, 49B are configured so that this electrical current flows through the cover layer 55.

For example, each first contact 49A is electrically connected through the substrate 12 to the core 52 of a corresponding semiconductor structure 47, while each second contact 49B is electrically connected to the doped layer 65 of the same semiconductor structure 47.

According to the embodiment shown in FIG. 3, the emitter 40 has a single first contact 49A connected to the core 52 of each semiconductor structure 47 and a single second contact 49B electrically connected to the doped layer 65 of each semiconductor structure 47.

In particular, the single second contact 49B is electrically connected through the substrate 12 to the block 50, which is itself electrically connected to the doped layer 65 of each semiconductor structure 47.

In particular, each semiconductor structure 47 is embedded in the block 50.

The block 50 is supported by the substrate 12, in particular by the first face 30. In the embodiment shown in FIG. 3, the block 50 is carried by the insulating layer 57.

The block 50 contains, for example, a layer 72 of a conductive and transparent or semi-transparent material for making contact with the layer 65 and connected to the electrode 49B. This material is, for example, ITO (indium tin oxide), graphene, or zinc oxide doped with gallium or aluminium. Layer 72 is, for example, a conformal coating overlying the semiconductor structure(s) 47 of the emitter 15A, 15B, 15C under consideration.

The block 50 also contains for example a mass 73 of a transparent planarising material such as SiO2 or a transparent polymer.

It should be noted that the materials used for the block 50 may vary.

In particular, the block 50 has a height greater than or equal to the height of each semiconductor structure 47, measured in the normal direction N.

The block 50 is in contact with each doped layer 65. Furthermore, the block 50 is not in contact with the cores 52. In particular, each cover layer 55 is interposed between the core 52 of the same semiconductor structure 47 and the block 50.

Each converter 45 is interposed in the normal direction N between the corresponding emitter 40 and the polariser 20. For example, each emitter 40 of a first or second emitting element 15A, 15B is interposed between the corresponding converter 45 and the substrate 12.

Each converter 45 is formed of a conversion material.

The conversion material is configured to convert the second radiation R2 emitted by the emitter 40 belonging to the same emitting element 15A, 15B into the corresponding first radiation R1A, R1B. In other words, the conversion material is configured to be excited by the second radiation R2 and to emit the first radiation R1A, R1B in response.

The second radiation R2 has a second wavelength range. The second range is, for example, separate from the first range. In particular, the second range has a second average wavelength, the second average wavelength being different from the first average wavelength. In particular, the second average wavelength is strictly greater than the first average wavelength.

However, embodiments in which the second range is identical to the first range are also possible.

The conversion material is, for example, a semiconductor material.

For example, the conversion material is selected from the group consisting of: CdSe, CdTe, ZnSe, ZnTe, InP, InPZnS, $Ag_2S$, CuInS, CuInSe, $AgInS_2$, $AgInSe_2$, or $InPZn_xSe_{x-y}S_y$. However, other types of materials are possible.

In other embodiments, the conversion material is a non-semiconductor material such as an inorganic garnet. For example, the conversion material is a doped yttrium-aluminium garnet. However, other types of non-semiconductor conversion materials, including other garnets, are possible.

In particular, the conversion material may be an inorganic phosphorus.

Yttrium-aluminium garnet based particles (e.g. YAG:Ce), terbium-aluminium garnet (TAG)-based particles (e.g. TAG:Ce), silicate-based particles (e.g. $SrBaSiO4$:Eu), sulphide-based particles (e.g. $SrGa_2S_4$:Eu, SrS:Eu, CaS:Eu, etc.), nitride-based particles (e.g. $Sr_2Si_5N_8$:Eu, $Ba_2Si_5N_8$:Eu, etc.), oxynitride-based particles (e.g. Ca-a-SiAlON:Eu, $SrSi_2O_2N_2$:Eu, etc.), and fluoride-based particles (e.g. $K_2SiF_6$:Mn, $Na_2SiF_6$:Mn, etc.) are examples of inorganic phosphors.

Many other conversion materials can be used, such as doped aluminates, doped nitrides, doped fluorides, doped sulphides, or doped silicates.

The conversion material is, for example, doped with rare earth elements, alkaline earth elements or transition metal elements. Cerium is, for example, sometimes used for doping yttrium-aluminium garnets.

The converter 45 comprises, for example, a set of particles P made of the conversion material. These particles P are sometimes called "luminophores".

In particular, the converter 45 comprises a plurality of layers of particles P, these layers of particles P being superimposed along the normal direction N.

In particular, the converter 45 is configured so that the first radiation R1A, R1B is rectilinearly polarised.

In particular, each first radiation R1A, R1B has a polarisation direction DP, this polarisation direction being for example perpendicular to the normal direction N. In particular, the polarisation direction DP is parallel to the direction D1, however the orientation of the polarisation direction DP may vary in the plane formed by the directions D1 and D2.

In particular, "parallel" means parallel to within 10 degrees (°), for example to within 5°, in particular to within 1° or better.

Each particle P has a first dimension in the first direction D1 and a second dimension in the second direction D2.

Each first or second dimension is between 1 nm and 1,000 nm.

Furthermore, a ratio between the numerator of the first dimension and the denominator of the second dimension is strictly greater than 1, in particular between 2 and 1,000. For example, the ratio is greater than or equal to 4.5.

Each particle P is, for example, a rod, tube or wire extending in the first direction D1.

Alternatively, each particle P is a platelet extending in a plane perpendicular to the second direction D2.

Alternatively or additionally, each particle P is, for example, a quantum box.

In one embodiment, each particle P has a core made of the conversion material and a shell surrounding the core. The core has, for example, a diameter of 50 nm or less, in particular 20 nm or less.

The shell is, for example, made of a semiconductor material with a band gap value that is strictly greater than the band gap value of the conversion material, or alternatively of an electrically insulating material.

The particles P are, for example, arranged along a set of eigenlines. Each eigenline is, for example, parallel to the polarisation direction DP.

In particular, the eigenlines are parallel to each other.

A distance between two consecutive eigenlines is, for example, between 1 nm and 10 μm.

A plurality of particles P are arranged along each eigenline.

In one embodiment, the particles P are arranged in at least one plane perpendicular to the normal direction N, for example in several parallel planes, with the particles in each plane forming a two-dimensional array in that plane.

The two-dimensional array is, for example, a rectangular mesh array. Alternatively, the array is a hexagonal, square or diamond mesh array.

It should be noted that embodiments in which the particles P are arranged along a set of parallel eigenlines without forming an array in the corresponding plane are also conceivable.

The quarter-waveplate 48 of each emitting element 15A, 15B, 15C is interposed between the emitter 40 and the polariser 20. For example, the quarter-waveplate 48 is in contact with the block 50, in particular with a face of the block 50 delimiting the block 50 along the normal direction N.

In particular, each converter 45 is carried by the corresponding quarter-waveplate 48, and is thus interposed between the quarter-waveplate 48 and the polariser 20 along the normal direction N. Thus, the quarter-waveplate 48 is provided to be crossed by the second radiation R2 when the second radiation R2 leaves the emitter 40 before reaching the corresponding converter 45 (in the case of a first or second emitting element 15A, 15B) or the polariser 20 (in the case of a third emitting element 15C).

The quarter-waveplate 48 has a slow axis. The slow axis is perpendicular to the normal direction N. In addition, the slow axis forms an angle of 45° with the polarisation direction DP.

The quarter-waveplate 48 is configured to introduce, in the second radiation R2, a phase shift equal to a quarter of $\pi$, or 90°, between the component along the slow axis of the second radiation R2 and the component along a direction, referred to as the fast axis, perpendicular to the slow axis and to the normal direction N. In particular, the quarter-waveplate 48 is configured to delay the component along the slow axis.

In one embodiment, shown in FIG. 2, the quarter-waveplate 48 is interposed between the converter 45 and the polariser 20. In such a case, the quarter-waveplate 48 is configured to introduce, in the first radiation R1A, R1B, a phase shift equal to a quarter of $\pi$, or 90°, between the component along the slow axis of the first radiation R1A, R1B and the component along a direction, referred to as the fast axis, perpendicular to the slow axis and to the normal direction N. In particular, the quarter-waveplate 48 is configured to delay the component along the slow axis.

The quarter-waveplate 48 is made of a birefringent material.

The quarter-waveplate 48 is, for example, made of $SiO_2$, silica, notably quartz or spar.

The quarter-waveplate 48 is, for example, common to each emitting element 15A, 15B, 15C. For example, the quarter-waveplate 48 is a single plate; between that plate and the substrate 12, each emitter 40 is interposed.

As shown in FIGS. 1, 2 and 3, the quarter-waveplate 48 delimits, for example, for each wall 70, a trench passing through the quarter-waveplate 48 in the normal direction N and accommodating the corresponding wall 70.

The polariser 20 is configured to be traversed in the normal direction N by each of the first radiations R1A, R1B, R1C.

For example, the polariser 20, each converter 45 and the corresponding emitter 40 are arranged along the same line segment parallel to the normal direction N.

The polariser 20 is, for example, a plate extending in a plane perpendicular to the normal direction N.

In particular, the polariser 20 faces the first face 30 of the substrate 12, each emitting element 15A, 15B, 15C being interposed between the first face 30 and the polariser 20.

The polariser 20 has an axis.

The axis of the polariser 20 is parallel to the polarisation direction DP. The second direction 20 is, for example, substantially parallel to the first direction D1.

The polariser 20 is configured to be traversed in the normal direction N by the component along the axis of the polariser 20 of each first radiation R1A, R1B, R1C, and to prevent propagation in the normal direction N of the component of each first radiation R1A, R1B, R1C in a direction perpendicular to the normal direction N and the axis of the polariser 20.

The polariser 20 is, for example, a metallic absorption polariser with metallic wires perpendicular to the polarisation direction DP.

The wall assembly 70 is configured to prevent each first radiation R1A, R1B, R1C emitted from one emitting element 15A, 15B, 15C from reaching another emitting element 15A, 15B, 15C. In addition, the wall assembly 70 is configured to prevent each second radiation R2 emitted by one emitting element 15A, 15B, 15C from reaching another emitting element 15A, 15B, 15C, in particular from reaching the converter 45 of that other emitting element 15A, 15B, 15C.

For example, the wall assembly 70 defines a set of cells 75 in a plane perpendicular to the normal direction N, each cell 75 accommodating at least the quarter-waveplate 48, for example the converter 45 and the quarter-waveplate 48, in particular the converter 45, the quarter-waveplate 48 and the emitter 40 of a single emitting element 15A, 15B, 15C.

In one embodiment, each wall 70 extends in the normal direction N from the first face 30. Alternatively, each wall 70 is accommodated between two neighbouring quarter-waveplates 48, but does not extend between the emitters 40 corresponding to those quarter-waveplates 48. For example, each wall 70 is formed in the layer formed by the quarter-waveplates 48.

It should be noted that embodiments in which at least one wall 70 extends from the first face 30 in a direction different from the normal direction N are conceivable.

Each wall 70 is configured to prevent each radiation R1A, R1B, R1C, R2 from passing through the barrier, in particular in a direction perpendicular to the normal direction.

Each wall 70 is, for example, configured to reflect the radiation(s) R1A, R1B, R1C, R2 emitted by the emitting element 15A, 15B, 15C received in the cell(s) 75 bounded by the wall 70.

Each wall 70 is, for example, made of a metallic material such as steel, especially stainless steel.

Alternatively, each wall 70 is configured to absorb each radiation R1A, R1B, R1C, R2 reaching the wall 70.

The control circuitry 25 is electrically connected to each first or second contact 49A, 49B and configured to impose a potential difference between the contacts 49A, 49B of each emitting element 15A, 15B, 15C so as to generate an electrical current through the emitter 40 of said emitting element 15A, 15B, 15C.

The control circuitry 25 comprises, for example, a set of components, in particular transistors, CMOS (Complementary Metal-Oxide Semiconductor) carried by the substrate 12, in particular when the substrate 12 is a semi-conductor such as silicon.

Alternatively or additionally, particularly when the substrate 12 is electrically insulating, the control circuit 25 comprises a set of thin film transistors. The thin-film transistor is a type of field effect transistor formed by the successive deposition of several thin layers (a few hundred nanometres).

Thanks to the use of a converter 45 emitting a first radiation R1A, R1B rectilinearly polarised according to a direction DP parallel to the axis of the polariser 20, the presence of the polariser 20 does not cause a loss of intensity of this first radiation R1A, R1B.

The efficiency of the optoelectronic device 10 is therefore improved compared to other optoelectronic devices 10 with an emitting element and a polariser.

Furthermore, in the case where the quarter-waveplate 48 is placed between the converter 45 and the polariser 20, the presence of the quarter-waveplate 48 makes it possible to reduce the intensity of stray light which would come from outside the optoelectronic device 10 and would reflect on all the emitting elements 15A, 15B, 15C and/or on the substrate 12. Indeed, this stray light, which is not polarised, would see its intensity greatly reduced by its first pass through the polariser 20, then through the quarter-waveplate 48, followed by a reflection on the substrate or the elements 15A, 15B, 15C, then another pass through the quarter-waveplate 48 before reaching the polariser 20, which will then block the great majority of it. The contrast of the optoelectronic device 10, when the latter is a screen in particular, is then improved.

Particles P having a ratio strictly greater than 1, in particular between 2 and 1,000, between the first and second dimensions make it possible to obtain a converter 45 emitting a first rectilinearly polarised radiation R1A, R1B in an easy manner, in particular via the deposition of these particles under an electric field oriented along the first direction D1.

Other methods of obtaining the converter 45 are also possible, such as optical lithography or grafting.

When the third emitting elements 15C are without the converter 45, the intensity of the R1C radiation is reduced by 50% as it passes through the polariser 20. This can be useful in the case where the radiation R2, R1C emitted by the corresponding emitter 40 is very intense compared to the intensity of the radiation R1A, R1B, in particular to control the rendering given by the emitting elements 15A, 15B, 15C if they are switched on at the same time. In particular, this is useful when the radiation R2 is blue, in order to achieve a good white balance.

The presence of the walls 70 avoids interference between neighbouring emitting elements 15A, 15B, 15C, and therefore allows better control of the colours emitted by the optoelectronic device 10.

Grafting is a process for attaching particles P to a surface, in which the surface is coated with a layer suitable for attaching the particles P to the surface. For example, the surface is functionalised using molecules attached to the surface and suitable to allow each particle P to bind to the surface via the molecule. In particular, one end of each molecule is suitable for attachment to the surface, and another end is suitable for attachment to a particle P of the conversion material, so that the particle P is attached to the surface by the molecule.

These molecules are sometimes called "surfactants", "bifunctional ligands", "polyfunctional ligands", "binders", "covering agents", etc.

It should be noted that any functional organic molecule with at least two functional reactive groups can be used as a molecule M in the present invention.

Examples of molecules M can be selected, for example, from the "organosilane" group, the "thiol" group, the "acrylate" group and the "amine" group.

The "organosilane" group includes, for example, 3-aminopropyltrimethoxysilane, 3-mercaptopropyltrimethoxysilane, 3-(methacryloyloxy)propyltrimethoxysilane and allyltrimethoxysilane.

The "thiol" group includes, for example, 1,6-hexanedithiol, trimethylolpropane tris(3-mercaptopropionate), pentaerythritol tetrakis(3-mercaptopropionate).

Examples of acrylates are poly(ethylene glycol)diacrylate, pentaerythritol triacrylate and pentaerythritol tetraacrylate.

Molecules in the "amine" group include bis(hexamethylene)triamine, bis(3-aminopropyl)amine, 3,3'-diamino-N-methyldipropylamine, etc.

The length of each molecule is chosen so as to impose an average distance between the particles. In particular, the length of each molecule is chosen so as to limit the risk of a particle P absorbing a first radiation R1A, R1B emitted by a neighbouring particle P.

It should be noted that embodiments in which several layers of molecules and several layers of particles P are stacked can be envisaged. For example, a layer of molecules is used to attach a first layer of particles P, with each further layer of particles P being attached to an underlying layer of particles P by a layer of molecules interposed between the two layers.

It should be noted that, although the optoelectronic device 10 has been described above in a case where each emitter 40 comprises one or more semiconductor structures, in particular of the LED type, other embodiments are conceivable.

For example, each emitter 40 is likely to comprise a light source emitting the second radiation R2, for example, and a liquid crystal system capable of switching between a configuration allowing the second radiation R2 to pass through the system to exit the emitter 40 and a configuration preventing the second radiation R2 from exiting the emitter 40.

In particular, the light source is, for example, common to all emitters 40. Alternatively, each emitter 40 has a light source separate from the other light sources.

It should also be noted that embodiments in which the polarisation direction DP forms a non-zero angle with the polariser axis 20 are also possible. In particular, this may allow a better balance to be achieved between the different radiations R1A, R1B, R1C at the output of the polariser 20.

Generally, it is intended that the polariser 20 is positioned in a polariser positioning step of a manufacturing process of the electronic device 10. In this step, a light intensity of at least one radiation R1A, R1B or R1C is measured, and the polariser 20 is positioned, in particular rotated about an axis parallel to the normal direction N, according to the measured light intensity. In particular, this allows the polariser axis 20 to be effectively oriented parallel to the polarisation direction DP, even if this polarisation direction DP is not exactly what was expected due to an inaccuracy during the manufacture of the converters 45.

In addition, embodiments in which at least one converter 45 generates rectilinearly polarised radiation R1A, R1B or R1C without the converter 45 comprising a set of particles P are also possible.

Furthermore, it turns out that even in the absence of the quarter-waveplate, the rectilinear polarisation of the radiations R1A and R1B is advantageous in particular in that it makes it possible to improve the intensity of these radiations R1A, R1B perceived by a user of the optoelectronic device, but that it also makes it possible to reduce the relative intensity of the radiation R1C. This allows the relative balance of these intensities to be altered, particularly in the context of white balance.

It should be noted that, although the emitting elements 15C have been described above as not comprising a converter 45, embodiments in which each emitting element 15C comprises a converter suitable for converting the second radiation R2 into the first radiation R1C are also possible.

In this case, the second radiation R2 differs from the first radiation R1C, for example at least in that the wavelength range of the first radiation R1C is distinct from the wavelength range of the second radiation R2. In particular, the second radiation R2 is ultraviolet radiation.

It should be noted that separate ranges may have a non-zero overlap.

The first R1C radiation has, for example, an elliptical polarisation.

When each emitting element 15C has a converter 45, a better balance of the colours emitted by the different emitting elements 15A, 15B, 15C can be achieved.

Alternatively, the first radiation R1C emitted by the polariser of the emitting element 15C is rectilinearly polarised in a direction parallel to the axis of the polariser 20. This may result in a higher emission efficiency of the first R1C radiation, as it is not attenuated by the polariser 20.

A second example optoelectronic device 10 will now be described. Elements identical to the first example are not described again. Only differences are highlighted.

The optoelectronic device 10 has a plurality of polarisers 20. In particular, the optoelectronic device comprises a polariser 20 for each emitting element 15A or 15B, and optionally for each emitting element 15C.

Each polariser 20 is configured to be traversed by the first radiation R1A, R1B or R1C from the emitting element 15A, 15B or 15C associated with the polariser 20. In particular, the emitting element 15A, 15B or 15C associated with the polariser 20 is interposed in the normal direction N between the polariser 20 and the substrate 12.

The axis of each polariser 20 is parallel to the polarisation direction DP of the corresponding emitting element 15A, 15B, 15C.

The polarisation direction DP of each emitting element 15A is different from the polarisation direction DP of each emitting element 15B and/or each emitting element 15C. Furthermore, the polarisation direction DP of each emitting element 15B is different from the polarisation direction DP of each emitting element 15C.

In particular, an angle between the polarisation direction DP of each emitting element 15A and the polarisation direction DP of each emitting element 15B or 15C is, for example, 90°, 5 degrees. However, this angle may vary.

An angle between the polarisation direction DP of each emitting element 15B and the polarisation direction DP of each emitting element 15C is, for example, 90°, 5 degrees. However, this angle may vary.

The particles P of each emitting element 15A, 15B, 15C are configured so that the corresponding first radiation R1A, R1B, R1C is rectilinearly polarised along the polarisation direction DP of the polariser 20 associated with the emitting element 15A, 15B, 15C in question.

In particular, the second example makes it possible to limit interference between neighbouring emitting elements 15A, 15B, 15C, since the first radiation R1A, R1B, R1C emitted by an emitting element 15A, 15B, 15C is attenuated by the polarisers 20 associated with the other emitting elements 15A, 15B, 15C. The resolution of the optoelectronic device 10 is therefore improved.

It should be noted that when the quarter-waveplate 48 is interposed between the converter 45 and the polariser 20, the polarisation direction DP is for example perpendicular to the axis of the polariser 20. In particular, the polarisation direction DP is parallel to the second direction D2.

Glossary

Doping

Doping is defined as the presence of impurities in a material that provide free charge carriers. Impurities are, for example, atoms of an element that is not naturally present in the material.

When impurities increase the volume density of holes in the material, compared to undoped material, the doping is called p-doping. For example, a gallium nitride layer, GaN, is p-doped by adding magnesium (Mg) atoms.

When impurities increase the volume density of free electrons in the material, compared to the undoped material, the doping is called n-doping. For example, a layer of gallium nitride, GaN, is n-doped by adding silicon (Si) atoms.

LED Structure

A LED structure is a semiconductor structure including a plurality of semiconductor regions forming a P-N junction and configured to emit light when an electric current flows through the individual semiconductor regions.

A two-dimensional structure including an n-doped layer, a p-doped layer and at least one emitting layer is an example of an LED structure. In this case, each emitting layer is interposed along the normal direction D between the n-doped layer and the p-doped layer.

In one embodiment, each emitting layer has a bandgap value strictly less than the bandgap value of the n-doped layer and strictly less than the bandgap value of the p-doped layer. For example, the n-doped layer and the p-doped layer are GaN layers, and each emitting layer is an InGaN layer.

The emitting layer is, for example, undoped. In other embodiments, the emitting layer is doped.

A quantum well is a specific example of an emitting layer with a bandgap value lower than the bandgap values of the n- and p-doped layers.

Quantum Well

A quantum well is a structure in which quantum confinement occurs, in one direction, for at least one type of charge carrier. The effects of quantum confinement occur when the size of the structure along this direction becomes comparable to or smaller than the De Broglie wavelength of the carriers, which are usually electrons and/or holes, leading to energy levels called "energy subbands".

In such a quantum well, the carriers may only have discrete energy values but are generally able to move within a plane perpendicular to the direction in which confinement occurs. The energy values available to the carriers, also called "energy levels", increase as the dimensions of the quantum well decrease along the direction in which confinement occurs.

In quantum mechanics, the "De Broglie wavelength" is the wavelength of a particle when the particle is considered as a wave. The De Broglie wavelength of electrons is also called the "electron wavelength". The De Broglie wavelength of a charge carrier depends on the material of which the quantum well is made.

An emitting layer whose thickness is strictly less than the product of the electron wavelength of the electrons in the semiconductor material of which the emitting layer is made and five is an example of a quantum well.

Another example of a quantum well is an emitting layer whose thickness is strictly less than the product of the De Broglie wavelength of excitons in the semiconductor material of which the emitting layer is made and five. An exciton is a quasi-particle including an electron and a hole.

In particular, a quantum well often has a thickness between 1 nm and 200 nm.

Semiconductor Material

The term "band gap value" should be understood to be the band gap value between the valence and conduction band of the material.

The band gap value is, for example, measured in electronvolts (eV).

The valence band is defined as the band with the highest energy of the energy bands that are allowed for electrons in the material and which is completely filled at a temperature of 20 Kelvin (K) or less.

A first energy level is defined for each valence band. The first energy level is the highest energy level of the valence band.

The conduction band is defined as the lowest energy band of the energy bands allowed for electrons in the material, which is not completely filled at a temperature of 20 K or less.

A second energy level is defined for each conduction band. The second energy level is the highest energy level of the conduction band.

Thus, each band gap value is measured between the first energy level and the second energy level of the material.

A semiconductor material is a material with a band gap value strictly greater than zero and less than or equal to 6.5 eV.

An example of a semi-conductor material is a direct band gap semiconductor. A material is considered to have a "direct band gap" when the minimum of the conduction band and the maximum of the valence band correspond to the same value of charge carrier momentum. A material is considered to have an "indirect band gap" when the conduction band minimum and valence band maximum correspond to different charge carrier momentum values.

Each semiconductor material may be selected, for example, from the group of III-V semiconductors, in particular III-nitrides, II-VI semiconductors, or IV-IV semiconductors.

III-V semiconductors include InAs, GaAs, AlAs and their alloys, InP, GaP, AlP and their alloys, and III-nitrides.

II-VI semiconductors include CdTe, HgTe, CdSe, HgSe, and their alloys.

IV-IV semiconductors include Si, Ge and their alloys.

Three-Dimensional Structure

A three-dimensional structure is a structure that extends along a main direction. The three-dimensional structure has a length measured along the main direction. The three-dimensional structure also has a maximum lateral dimension measured along a lateral direction perpendicular to the main direction, the lateral direction being the direction perpendicular to the main direction along which the dimension of the structure is greatest.

The maximum lateral dimension is, for example, less than or equal to 10 micrometers ($\mu$m), and the length is greater than or equal to the maximum lateral dimension. The maximum lateral dimension is advantageously less than or equal to 2.5 $\mu$m.

In particular, the maximum lateral dimension is greater than or equal to 10 nm.

In specific embodiments, the length is greater than or equal to twice the maximum lateral dimension, for example it is greater than or equal to five times the maximum lateral dimension.

The main direction is, for example, the normal direction D. In this case, the length of the three-dimensional structure is called "height" and the maximum dimension of the three-dimensional structure, in a plane perpendicular to the normal direction D, is less than or equal to 10 $\mu$m.

The maximum dimension of the three-dimensional structure, in a plane perpendicular to the normal direction D, is often referred to as the "diameter" regardless of the shape of the cross-section of the three-dimensional structure.

For example, each three-dimensional structure is a microwire. A microwire is a cylindrical three-dimensional structure.

In one specific embodiment, the microwire is a cylinder extending along the normal direction D. For example, the microwire is a cylinder with a circular base. In this case, the diameter of the base of the cylinder is less than or equal to half the length of the microwire.

A microwire with a maximum lateral dimension of less than 1 µm is called a "nanowire".

Another example of a three-dimensional structure is a pyramid extending along the normal direction D from the substrate 12.

Another example of a three-dimensional structure is a cone extending along the normal direction D.

Another example of a three-dimensional structure is a truncated cone or a truncated pyramid extending along the normal direction D.

Polarisation

The polarisation of a radiation is a property of this radiation related to the temporal phase shift between the components of the electric field of each wave composing that radiation in two directions perpendicular to each other and perpendicular to the direction of propagation of that radiation.

When the two components are temporally in phase, the polarisation is said to be "rectilinear". It is reflected in the existence of a direction, called the polarisation direction, to which the electric field vector of the wave is parallel at each instant.

When the two components have a non-zero time phase shift, the polarisation is said to be "elliptical". In the special case where the two components have the same amplitude and are 90 degrees (°) out of phase, the polarisation is then said to be "circular".

Quantum Box

A quantum box is a structure in which quantum confinement occurs in all three spatial dimensions.

To give an order of magnitude, a particle P with a maximum size between 1 nm and 1 µm, made of a semiconductor conversion material, is an example of a quantum box.

The invention claimed is:

1. An optoelectronic device comprising:
   at least a first emitting element, each first emitting element being configured to emit a first radiation having a first range of wavelengths; and
   a polariser, the polariser having an axis, the polariser configured to interact with the first radiation,
   each first emitting element comprising:
   an emitter configured to emit a second radiation having an elliptic polarisation on a second range of wavelengths, the second range being distinct from the first range, and
   a converter configured to receive the second radiation emitted by the emitter, at least partially absorb the second radiation, and to emit the first radiation in response,
   each converter being interposed between the emitter and the polariser, each converter being configured so that the first radiation is rectilinearly polarised along a polarisation direction.

2. The optoelectronic device according to claim 1, wherein a quarter-waveplate is interposed between the emitter and the converter, the quarter-waveplate having a slow axis forming an angle of 45 degrees with the axis of the polariser.

3. The optoelectronic device according to claim 2, wherein the polarisation direction is parallel to the axis of the polariser.

4. The optoelectronic device according to claim 1, wherein a quarter-waveplate is interposed between the converter and the polariser, the quarter-waveplate having a slow axis forming an angle of 45 degrees with the axis of the polariser.

5. The optoelectronic device according to claim 4, wherein the polarisation direction is perpendicular to the axis of the polariser.

6. The optoelectronic device according to claim 1, wherein the polariser is configured to be traversed by each first radiation in a normal direction perpendicular to the axis of the polariser, each converter comprising a set of particles having a first dimension in a first direction parallel to the polarisation direction and a second dimension in a second direction perpendicular to the polarisation direction and to the normal direction, a ratio between, in the numerator, the first dimension, and in the denominator, the second dimension, being greater than or equal to two.

7. The optoelectronic device according to claim 6, wherein each first or second dimension is between 1 nanometer and 1,000 nanometers.

8. The optoelectronic device according to claim 1, wherein each emitter comprises a light-emitting diode.

9. The optoelectronic device according to claim 1, wherein each emitter comprises a liquid crystal.

10. The optoelectronic device according to claim 1, wherein the second radiation is a blue light.

11. The optoelectronic device according to claim 1, further comprising at least one second emitting element, each second emitting element being configured to emit a third radiation having a third wavelength range different from the first range, the polariser being configured to be traversed at least partially by the third radiation.

12. The optoelectronic device according to claim 11, wherein the third radiation is identical to the s second radiation, each second emitting element being without a converter.

13. The optoelectronic device according to claim 1, comprising a plurality of emitting elements, the optoelectronic device further comprising at least one barrier interposed between each emitting element and each other emitting element, the barrier being configured to prevent each radiation from passing through the barrier.

14. The optoelectronic device according to claim 1, wherein each first radiation is selected from the group consisting of: red light and green light.

15. The optoelectronic device according to claim 1, comprising a plurality of polarisers, each polariser being associated with a corresponding emitting element, the polariser being configured to be traversed at least partially by the first radiation emitted by the corresponding emitting element, the polarisation direction of at least one emitting element being different from the polarisation direction of at least one other emitting element, the polarisation direction of each emitting element associated with a polariser being parallel to the axis of the corresponding polariser.

16. The optoelectronic device according to claim 1, comprising a plurality of emitting elements, wherein the polarisation direction of at least one emitting element is different from the polarisation direction of at least one other emitting element, the electronic device comprising a polariser configured to be traversed at least partially by the first radiation emitted by each of the two emitting elements in question.

17. The optoelectronic device according to claim 15, wherein an angular difference between the polarisation directions of at least two emitting elements is between 85 degrees and 95 degrees.

18. The optoelectronic device according to claim 2, wherein the polariser is configured to be traversed by each first radiation in a normal direction perpendicular to the axis of the polariser, each converter comprising a set of particles having a first dimension in a first direction parallel to the polarisation direction and a second dimension in a second direction perpendicular to the polarisation direction and to the normal direction, a ratio between, in the numerator, the first dimension, and in the denominator, the second dimension, being greater than or equal to two.

19. The optoelectronic device according to claim 3, wherein the polariser is configured to be traversed by each first radiation in a normal direction perpendicular to the axis of the polariser, each converter comprising a set of particles having a first dimension in a first direction parallel to the polarisation direction and a second dimension in a second direction perpendicular to the polarisation direction and to the normal direction, a ratio between, in the numerator, the first dimension, and in the denominator, the second dimension, being greater than or equal to two.

20. The optoelectronic device according to claim 4, wherein the polariser is configured to be traversed by each first radiation in a normal direction perpendicular to the axis of the polariser, each converter comprising a set of particles having a first dimension in a first direction parallel to the polarisation direction and a second dimension in a second direction perpendicular to the polarisation direction and to the normal direction, a ratio between, in the numerator, the first dimension, and in the denominator, the second dimension, being greater than or equal to two.

21. An optoelectronic device comprising at least a first emitting element and a plurality of polarisers, each first emitting element being configured to emit a first radiation having a first range of wavelengths, the polariser being configured to be traversed at least partially by the first radiation, each first emitting element comprising an emitter and a converter, the emitter being configured to emit a second radiation having an elliptic polarisation on a second range of wavelengths, the second range being distinct from the first range, the converter being configured to at least partially absorb the second radiation and to emit the first radiation in response, the polariser having an axis, each converter being interposed between the emitter and the polariser, each converter being configured so that the first radiation is rectilinearly polarised along a polarisation direction, wherein each polariser is associated with a corresponding emitting element, each polariser being configured to be traversed at least partially by the first radiation emitted by the corresponding emitting element, the polarisation direction of at least one emitting element being different from the polarisation direction of at least one other emitting element, the polarisation direction of each emitting element associated with a polariser being parallel to the axis of the corresponding polariser.

22. An optoelectronic device comprising a plurality of emitting elements and a polariser, each emitting element being configured to emit a first radiation having a first range of wavelengths, the polariser being configured to be traversed at least partially by the first radiation, each emitting element comprising an emitter and a converter, the emitter being configured to emit a second radiation having an elliptic polarisation on a second range of wavelengths, the second range being distinct from the first range, the converter being configured to at least partially absorb the second radiation and to emit the first radiation in response, the polariser having an axis, each converter being interposed between the emitter and the polariser, each converter being configured so that the first radiation is rectilinearly polarised along a polarisation direction, wherein the polarisation direction of a first of the emitting elements is different from the polarisation direction of a second of the emitting elements, and wherein the polariser is configured to be traversed at least partially by the first radiation emitted by each of first and second emitting elements.

\* \* \* \* \*